United States Patent [19]

Espy

[11] Patent Number: 4,920,814

[45] Date of Patent: May 1, 1990

[54] APPARATUS FOR OPERATING A SHAFT

[76] Inventor: Isaac P. Espy, 3518 Tall Pins La., Tuscaloosa, Ala. 35405

[21] Appl. No.: 322,197

[22] Filed: Mar. 13, 1989

[51] Int. Cl.⁵ ............................................. F16H 1/20
[52] U.S. Cl. ................................ 74/89.15; 74/424.8 R
[58] Field of Search ........................ 74/89.15, 424.8 R

[56] References Cited

U.S. PATENT DOCUMENTS

| | | | |
|---|---|---|---|
| 3,459,057 | 8/1969 | Bonneric | 74/424.8 R X |
| 3,505,888 | 4/1970 | Denkowski | 74/89.15 |
| 4,346,728 | 8/1982 | Sulzer | 74/89.15 X |
| 4,465,091 | 8/1984 | Keller | 74/89.15 X |

Primary Examiner—Peter R. Brown

Attorney, Agent, or Firm—Nies, Kurz, Bergert & Tamburro

[57] ABSTRACT

Apparatus is disclosed for imparting to a shaft either rotation or translation or both, by the rotation of one or both of two gears within the apparatus. Translation is provided by the rotation of a first gear having internal threads, which threads match a toothed rack superimposed upon a shaft which passes through the gear. Rotation of the shaft is provided by rotation of a second gear which is slotted to match the shaft and rack which passes through the second gear. The separate elements of first gear, second gear and racked shaft are each held in position relative to the other elements so as to allow desired movement of the elements while restraining all other movements.

5 Claims, 1 Drawing Sheet

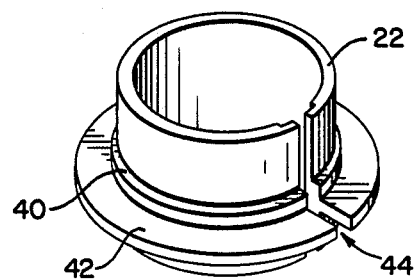
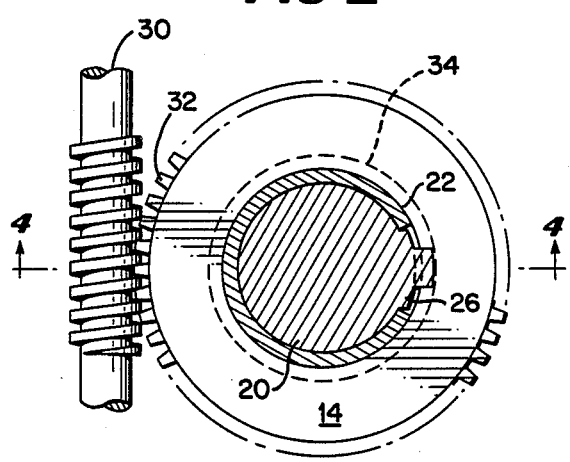
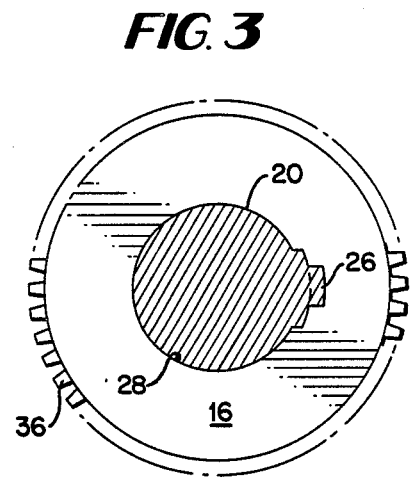
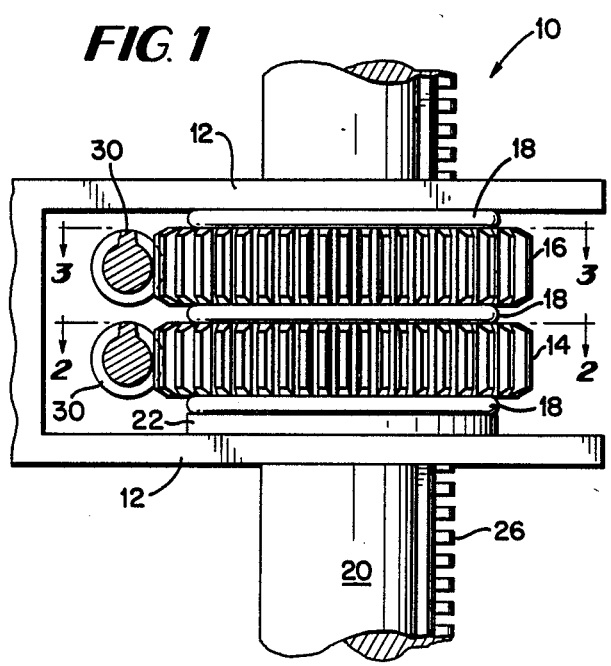
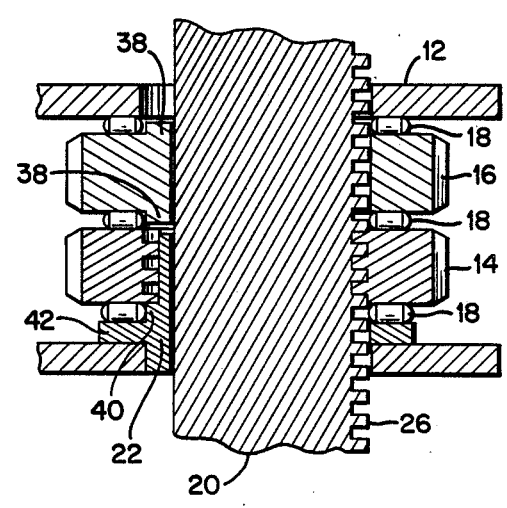

APPARATUS FOR OPERATING A SHAFT

BACKGROUND AND SUMMARY OF THE INVENTION

This invention relates to apparatus for imparting to a shaft either rotation or translation or both.

The capability for imparting to a shaft both rotary and linear motion has many desirable advantages. The advancing and rotating chuck of a drill press is a common embodiment of one such advantage. The patents of Moore (U.S. Pat. No. 885,945) and Doubet (U.S. Pat. No. 1,013,281) illustrate early application in this art.

A different use of this advantage is found in Gill (U.S. Pat. No. 1,413,982) wherein an embodiment is used to detect differences in the rotational speeds of two systems. Later embodiments in the art have developed for the robotic movement of a shaft or of a member attached to a shaft, such as Fornataro (U.S. Pat. No. 3,483,765) and Martin et al (U.S. Pat. No. 3,805,629).

A common feature of all these prior art devices provides for translation of a threaded shaft of circular cross section by rotating a threaded gear around the shaft while restraining the rotation of the shaft; coupled with this is another member which can rotate the shaft. In all of these devices there is used a threaded shaft which has threads substantially circumferential to and running the length of travel of the shaft. The threads are typically interrupted only by the use of one or two keyways running the length of travel of the shaft.

By the present invention there is provided an improved apparatus for imparting to a shaft either rotation or translation or both, by the rotation of one or both of two gears within the apparatus. Translation is provided by the rotation of a first gear having internal threads, which threads match a toothed rack superimposed upon a shaft which passes through the gear. Rotation of the shaft is provided by the rotation of a second gear which is slotted to match the shaft and rack which passes through the second gear. The separate elements of first gear, second gear, and racked shaft are each held in position relative to the other elements so as to allow desired movement of the elements while restraining all other movements.

Since the threaded rack is superimposed on the shaft, an existing unthreaded shaft may be employed on which a rack may be added. A further advantage and object of the invention is the ability with this apparatus to use a shaft of any geometric cross-section. An additional advantage and object of the invention is the use of a shaft having a minimum of threaded surface.

The gears of the present apparatus may be rotated by any suitable means and different means may be employed for the different gears. Other objects and advantages of the invention are described in the specification, drawings and claims.

BRIEF DESCRIPTION OF THE DRAWINGS

FIG. 1 is an elevational view of the apparatus of the present invention.

FIG. 2 is a cross-sectional view taken along line 2—2 of FIG. 1.

FIG. 3 is a cross-sectional view taken along line 3—3 of FIG. 1.

FIG. 4 is a cross-sectional view taken along line 4—4 of FIG. 2.

FIG. 5 is a perspective view of a preferred embodiment of the bushing employed in the apparatus of FIG. 1.

DESCRIPTION OF THE PREFERRED EMBODIMENTS

In the embodiment of the present invention as shown in FIGS. 1 through 5, there is provided a gear assembly apparatus 10 which includes a frame 12 which can be part of a larger machine or device. The frame 12 may be structured so as to provide support only for the gear assembly apparatus of the present invention, or it may provide support for the gear assembly, shaft, and also for other devices attached to the shaft. The principal function of the frame 12 as shown is to provide means on either side of the gear assembly for preventing motion of the gears other than rotation.

A first gear employed in the present invention is shown by numeral 14, and there is also shown a second gear 16. Roller thrust bearings 18 are provided above, below and between the first gear 14 and second gear 16, as shown in FIG. 1, to isolate these gears 14, 16 from substantial rotational friction. Depending upon service requirements and power sources available, these bearings 18 may be eliminated or replaced by other means. No significance is attached to the order of the first 14 and second 16 gears as either gear can be located above the other.

Because the apparatus 10 is constructed for use with a racked shaft 20, there are no threads extending around the entire circumference of the shaft 20 which would allow the shaft 20 and the first gear 14 to be maintained in a close fit with respect to each other. Therefore means is required to keep the rotational axis of the first gear 14 coincident with the rotational axis of the shaft 20. This may be accomplished by other means, such as bearings or the like positioned outside the gear assembly, but in a preferred embodiment is accomplished by use of a slotted bushing 22. The bushing 22 is provided with a flange 42 which restrains the bushing 22 from axial movement. It has been found that oil impregnated bronze makes a superior bushing 22, but other materials may be used instead.

In one embodiment of the invention the first gear 14 and the second gear 16 are both toroidal in shape. The first gear 14 has internal threads of a pitch matching the teeth of the rack 26 superimposed on the shaft 20. As the first gear 14 is rotated, its motion translates or moves the shaft 20 in a linear motion along the shaft axis.

As shown in FIGS. 2 and 4, the threads of first gear 14 engage the rack 26, but elsewhere around the circumference of shaft 20 the bushing 22 is positioned between the first gear 14 and the shaft 20.

The bushing 22 is shown in FIG. 4 as substantially filling the void between the outer surface of the shaft 20 and the innermost surface of the internal threads of gear 14. The broken line 34 represents the root surface of the threads of gear 14. As can be seen, the rack 26 meshes with and converts the rotational movement of the internal threads of gear 14 into translation of the rack 26 and shaft 20.

FIG. 5 is a perspective view of a preferred embodiment of the bushing 22. A small sub-flange 40 may be provided on the bushing 22 for alignment of the thrust bearing 18 isolating the first gear 14 and the bushing 22. The sub-flange 40 and the main flange 42 are shown, as well as a slot 44 which is adapted to allow the rack 26 to pass unrestrained along the linear axes of the shaft 20 and bushing 22.

While the shaft 20 is shown in circular cross-section, it should be emphasized that any of various geometric cross-sections may be employed for the shaft. The bushing 22 would simply have a cross-sectional plan so as to fill the void between shaft and gear 14. It is not necessary that the shaft be solid in construction. Also, the toothed rack 26 may be made integral with the shaft 20 or applied separately as would be useful in a retro-fit.

The rack 26, as shown in the drawings, may extend around the circumference of the shaft 20 to the extent necessary to properly transfer the forces acting linearly along the shaft 20 to the threads of the first gear 14. To accomplish the objects of the present invention, this should be limited to no more than 180° around the circumference of the shaft 20 As long as sufficient structure is provided to transmit the applied forces acting through the teeth of the rack 26, the device is efficient in inverse proportion to the frictional area exposed between rack teeth and gear thread. A relation of cross-sectional areas of rack and shaft as shown in the drawings is employed in a preferred embodiment.

The second gear 16 has an internal aperture 28 substantially fitting and enclosing the periphery in cross-section of the racked shaft 20. Thus the shaft 20 is free to travel along the axis of rotation of the second gear 16, but the shaft 20 and second gear 16 rotate together. Small ridges 38 may be employed on the upper and lower surfaces of the second gear 16 interiorly of the thrust bearings 18 to keep the thrust bearings 18 aligned when they are used.

The outer surfaces of the first gear 14 and second gear 16 are adapted for transfer to the gears of rotation. This may be accomplished by friction drive, spur gears, belts, or as shown for illustration only, by worm gears 30. Where accurate movement without reverse drive is required, a worm-worm gear arrangement is preferred.

The power means used to drive the first gear 14 and second gear 16 are a matter of choice depending upon the service for which the apparatus 10 is intended.

FIG. 2 is a cross sectional view taken through the first gear 14. The profile of the outer surface 32 of the gear 14 is of course dependent upon the rotating means selected. The outer surface 32 is shown here to match with a worm 30.

FIG. 3 is a cross-sectional view taken through the second gear 16. This gear 16 also has an outer surface 36 which is adapted to the means selected to rotate that gear 16. The central aperture 28 of second gear 16 is shown as matching the periphery of the cross-section of the shaft 20 and rack 26. It can be seen from this drawing that the actual cross-sectional geometric shape of the shaft 20 is not of critical importance.

As to other possible modifications of the apparatus shown in the drawings, a spacer of any kind can be used to separate the gears from each other or from the frame 12. Thus the first gear 14 and the second gear 16 may actually be distant from each other along the shaft 20 as long as they are restrained from motion along the axis of the shaft 20. The embodiment shown in the drawings is particularly desirable when compactness and economy are required.

In operation, either of the two gears 14, 16 may be rotated without regard to the activity of the other gear. The device 10 shown, for example, may be used to control the depth and direction of an electric trolling motor for fishing. In that application, small motors would be mounted on the frame and correctly geared to the worm drives. This device 10 has advantage over previous apparatus in that a trolling motor may be easily retro-fitted with the gear assembly device 10. A properly sized rack is merely attached to the shaft of the trolling motor and the shaft and rack inserted through the gear assembly. In this way the trolling motor may be steered, and/or raised and lowered remotely. Other useful applications are available in the field of remote or robotic requirements of various kinds.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A gear assembly for mechanical movement of a shaft in axial and rotational directions selectively, comprising:
   a first gear and a second gear mounted on a shaft;
   said first gear being toroidal in shape, having an inner surface parallel with and radial to its axis of rotation and having a threaded inner surface, and having means for restraining all motion of the gear relative to the shaft except rotation;
   said shaft having an axis of translation along its longitudinal axis coincident with the axis of rotation of said first gear, having superimposed on the shaft a toothed rack parallel with and radially distant from the shaft axis with said rack having teeth at a pitch matching and engaging the threaded inner surface of the first gear, said shaft having freedom of translation restrained only by the threads of said first gear;
   said second gear being toroidal in shape, having an inner surface which is parallel with the axis of the shaft and which in cross-section in a plane normal to the axis of the shaft is substantially identical in periphery to the periphery of the shaft and rack, said second gear enclosing said shaft and allowing translation of the shaft relative to said gear;
   means for imparting rotation to said first gear; and
   means for imparting rotation to said second gear and enclosed shaft.

2. The gear assembly of claim 1, wherein said means for restraining all motion of the first gear relative to the shaft except rotation includes a bushing having an axis coincident with the rotational axis of the first gear, said bushing having a cross-section in a plane normal to said axis which substantially fills the area between the threaded inner surface of the first gear and the outer periphery of the shaft and rack, said bushing having a slot which extends parallel to the axis of the first gear for relative translation of the rack within the slot, and said bushing having means for restraining translation relative to the rotational axis of said first gear.

3. The gear assembly of claim 2 wherein said means for restraining translation of said bushing relative to the rotational axis of said first gear includes a flange on the exterior of said bushing.

4. The gear assembly of claim 1 wherein the toothed rack of said shaft has a width at its greatest radius from the shaft axis, in a plane normal to the shaft axis, which subtends an arc of not more than 180°.

5. The gear assembly of claim 1 wherein the first and second gears are separated by a roller thrust bearing positioned therebetween.

* * * * *